United States Patent [19]
Minick

[11] 3,828,157
[45] Aug. 6, 1974

[54] METHOD OF SEAMING WIRE CLOTH

[75] Inventor: David G. Minick, Westfield, Mass.

[73] Assignee: The Sinclair Company, Holyoke, Mass.

[22] Filed: Feb. 26, 1973

[21] Appl. No.: 335,889

[52] U.S. Cl............................ 219/67, 219/58, 219/91
[51] Int. Cl............................................. B23k 31/06
[58] Field of Search ....... 219/56, 58, 67, 78, 80–83, 219/86, 87, 91

[56] References Cited
UNITED STATES PATENTS

| | | | |
|---|---|---|---|
| 2,473,859 | 6/1949 | Butler | 219/58 X |
| 3,370,150 | 2/1968 | Nordoren | 219/58 X |
| 3,573,418 | 4/1971 | Amakasn | 219/58 |

*Primary Examiner*—C. L. Albritton
*Attorney, Agent, or Firm*—Chapin, Neal and Dempsey

[57] ABSTRACT

Method of seaming metal wire fabric or screen of fine mesh onto a cylindrical support structure, such as a dandy roll or cylinder mould by securing to the structure a first metal wire cloth under layment at least along the seaming site of the fabric. The fine mesh fabric is then wrapped around the structure and tensioned with its ends held in registered, abutting relationship. The fine wire fabric is spot welded along and adjacent its abutting edges to the metal cloth. The welding pulses are controlled as to both shape and number to fuse the two wire materials together without overheating various gauges of metal fabric.

5 Claims, 5 Drawing Figures

METHOD OF SEAMING WIRE CLOTH

BACKGROUND

Rolls such as cylinder moulds and dandy rolls are conventionally covered with a fine mesh woven metallic fabric or screen. Such mesh covers are generally installed by tensioning the wire fabric around the roll and seaming the ends of the wire mesh together, either by hand sewing or by brazing with precious metal alloys. Performance of rolls with handsewn edge seams is usually characterized by the tendency of "marking" the paper sheet product. Such "marking" results from variations in the thickness of the paper sheet product along the line of engagement with the sewn seam as compared with the portion of the sheet which does not contact the seam. Such imperfection is detectable not only as a surface discontinuity but also as a difference in light transmission through the paper sheet.

With brazed seams employing precious metal alloys, uniform porosity through the wire fabric or cloth can be maintained be carefully controlling application of brazing material as to mount and disposition to approximate the diameter and location of a longitudinally extending wire of the metallic fabric. Such brazed seams produce excellent results in the formation of paper sheets in that drainage rate of the water carrying the paper fibers is generally uniform through such fabrics, including the seam areas and does not create any discontinuity or displacement of fibers which result in seam marks. Unfortunately, however, since the brazing materials employed are composed of different metallic alloys from the composition of the wire cloth, such seams are subject to corrosive attack by chemicals used in the papermaking process. Consequently, splitting or other failure of brazed seams frequently occurs prior to the normal life expectancy of the woven wire cloth covers per se.

The principal object of this invention is to provide an improved method of seaming wire cloth onto a cylindrical support structure which overcomes the shortcomings of the methods heretofore employed and results in a product which does not cause "marking" of the paper product.

Another object of this invention is to provide a method of seaming wire cloth onto a cylindrical support structure wherein the problem of corrosive attack of the seam is overcome.

A further object of this invention is to provide a method of seaming together the ends of metallic wire fabric on a cylindrical support by spot welding the fabric end portions to an underlayment by controlling the amplitude and time duration of the welding pulses in relation to the wire gauge to fuse the wire cloth to the underlayment.

The above and other objects of this invention will be more readily apparent from the following description and with reference to the accompanying drawings, in which FIG. 1 is an elevational view with parts cut away, illustrative of one method embodying this invention;

Figure 1:
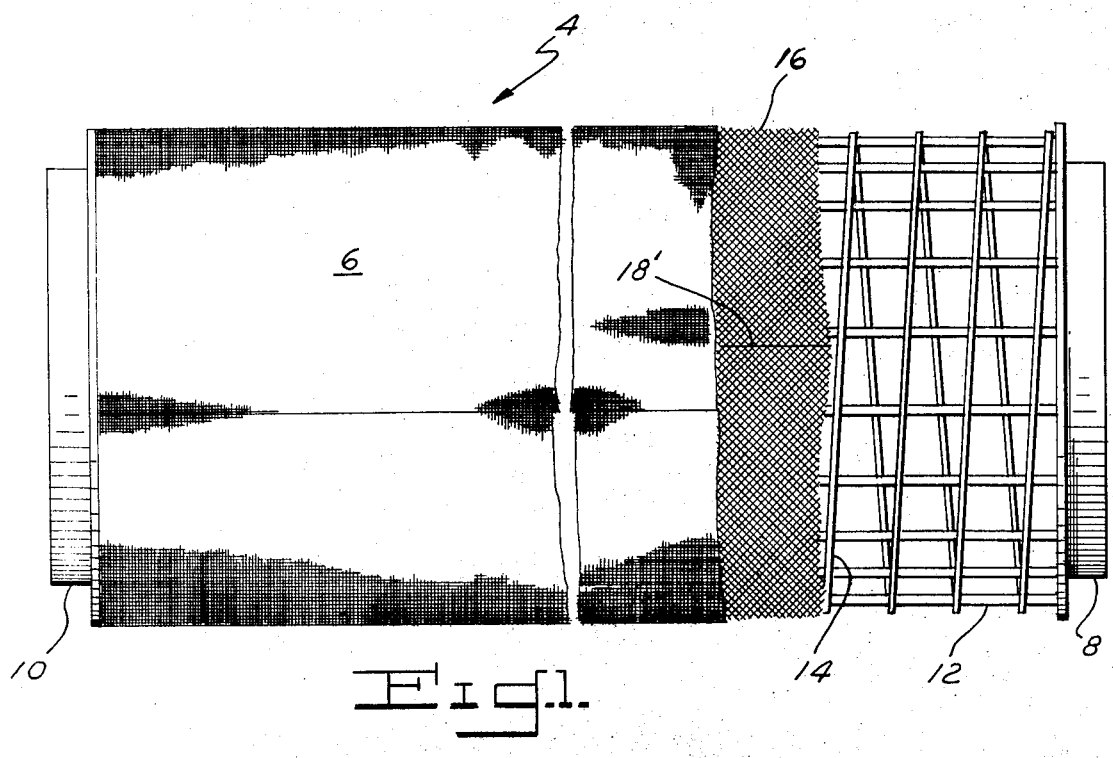

Referring in detail to the drawings, in FIG. 1 is shown a dandy roll 4 having a metallic wire mesh fabric covering 6 applied by the method embodying this invention.

The roll 4 is composed of trunnion or end rings 8 and 10. The end rings are joined into a roll structure by a plurality of truss rods 12 which are secured to a flange or coil ring and extend longitudinally therebetween. A helically extending resiliently flexible strip or "winding wire" 14 is spiralled around the cylinder from end-to-end thereof and provides a supporting surface for the wire mesh fabric 6.

In one embodiment of this invention a coarse or relatively open mesh stainless steel backing wire screen or underlayment 16 is wrapped around the roll providing an overall covering for the winding wire 14. The screen 16 may, for example, be a 10 mesh screen tensioned about the wire, its edges are trimmed and exactly butted as shown at 18 in FIG. 1. The screen 16 is then spot welded to the winding wire 14 at a plurality of closely spaced locations along and adjacent the seam edge 18.

Alternatively, the butted edge of screen 16 may be sewn together with a fine wire if for any reason it is preferable not to attach the screen to the winding wire support.

A fine mesh stainless steel fabric 40–60 mesh or finer, as shown at 6, is thereafter wrapped around the underlayment or backing screen 16. The edges of the fabric are trimmed and the fabric 6 tensioned so that its edges butt exactly.

The edges of the fabric are spot welded to the coarse mesh backing while the fabric 6 is held under tension. A plurality of spot welds are utilized along the butting edges and for a few inches outwardly of these edges in sufficient number and with generally uniform spacing so that the wire fabric is securely affixed to the underlayment or backing screen.

Figure 2:
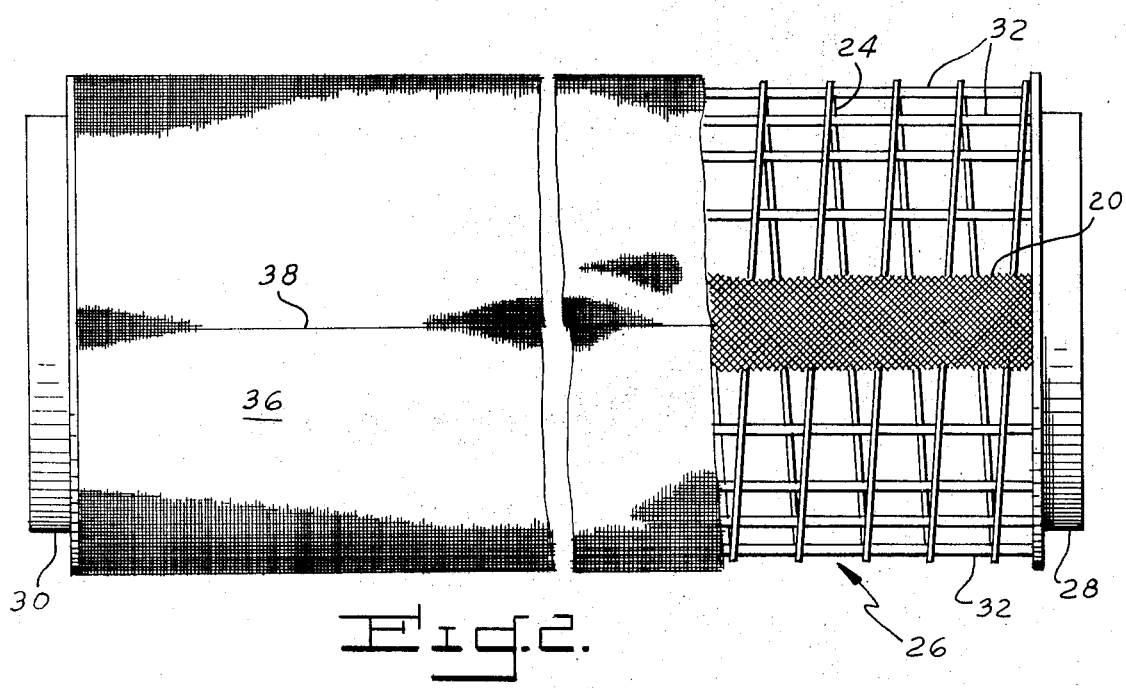
FIG. 2 is a view similar to FIG. 1 showing an alternative method embodying this invention.

An alternative method for carrying out this invention is illustrated in FIG. 2. In accordance with this method, a strip or band 20 of relatively coarse wire mesh is applied and secured to the outer surface of the winding wire 24 of a dandy roll 26 which may be generally of the same construction as the roll illustrated in FIG. 1. The roll includes end rings or trunnions 28 and 30 and longitudinally extending truss rods 32 connected to the two trunnions for supporting the winding wire 24.

The wire fabric strip 20 may be affixed to the winding wire along a straight line by any suitable means, such as spot welding the fabric at a series of uniformly spaced locations.

A fine mesh of metallic wire cloth 36 may then be wrapped around the roll and tensioned so that its free ends are drawn into abutting edge-to-edge relationship forming a seam line, such as shown at 38, which is disposed approximately along the center line of the strip 20. While the fabric 36 is so held, it is fused to the underlying fabric strip 20 along the seam line 38 and at a plurality of generally uniformly spaced locations or sites outwardly of the seam line. It will also be realized that the fabric 36 may be seamed directly to the winding wire 24, omitting the use of an underlayment. In any case, welding is accomplished by controlling the number and size of pulses comprising the welding impulse by suitable means as shown in FIG. 3 to achieve metal fusion without distortion of the metal.

Figure 3:
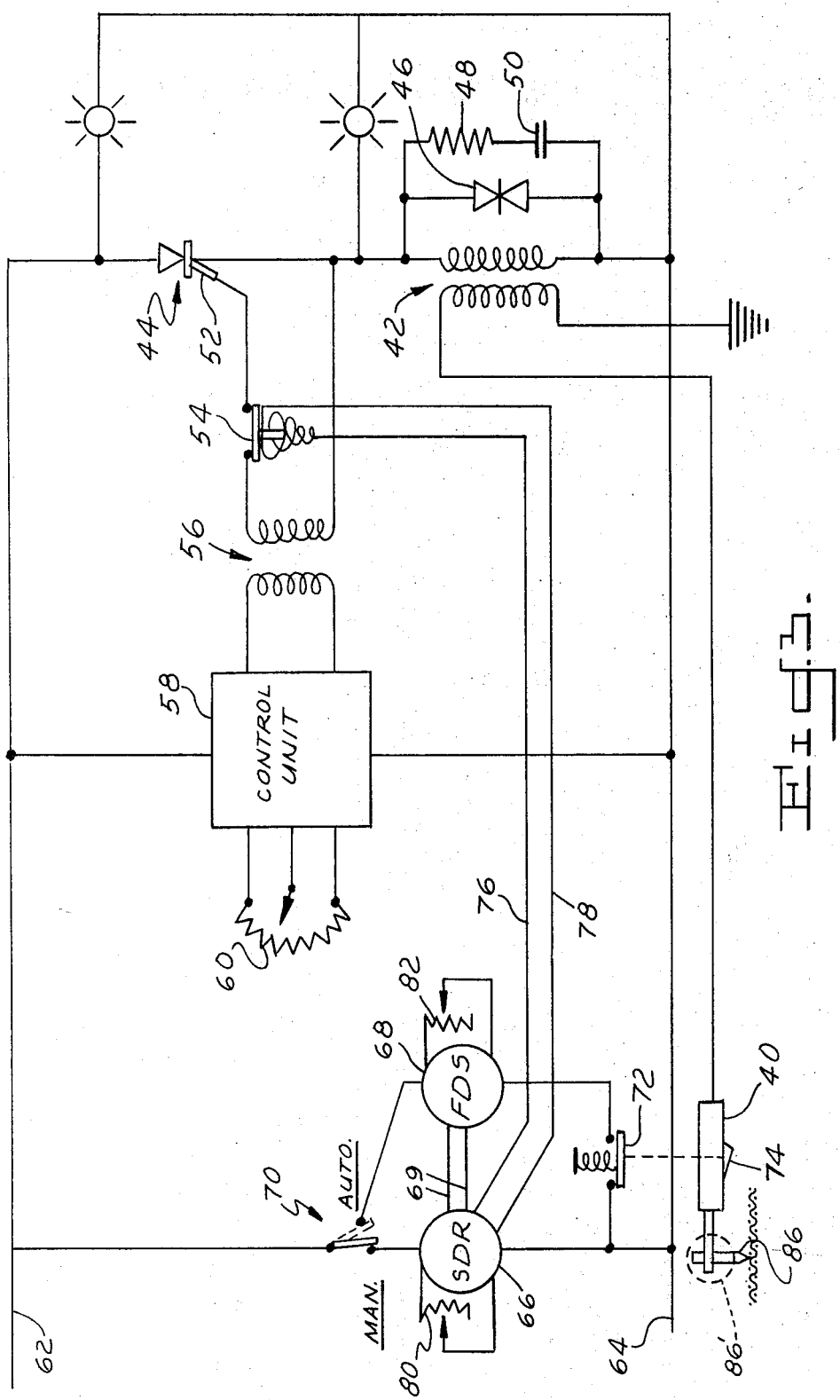
FIG. 3 is a schematic circuit diagram illustrative of spot welding apparatus which may be employed in carrying out this invention.

A welding device is shown generally at 40 in circuit with the secondary of a transformer 42 of one illustrative welding control circuit diagrammatically shown in FIG. 3. The primary winding of transformer 42 is connected in series with the anode and cathode of a silicon controlled rectifier (SCR) 44. A thyrector 46, resistor 48 and capacitor 50 are connected in parallel across the primary winding of the transformer 42. The thyrector serves as an arc suppressor and consists of a dual avalanche diode which reduces transient voltages. As the voltage rises about a rated peak, the thyrector current increases rapidly and together with the resistor 48 and capacitor 50 dissipates the transient energy.

Gate 52 of the SCR is connected through relay or switch 54 to the secondary of a pulse transformer 56 and back to the cathode of the SCR. The primary of the transformer 56 is connected to a control unit 58 which is adjustable by means of potentiometer 60 for controlling the firing of the SCR 44.

One typical circuit of the type which may be utilized for triggering the SCR 44 is diagrammatically shown in FIG. 4 and will be hereinafter more fully described.

The control unit 58 (FIG. 3) is connected across input leads 62 and 64 connected to a suitable alternating-current source, such as 110– 115 volts 60 cycle A.C. Also connected across the input leads is a single shot time delay relay 66 for use in spot welding applications where individual welding pulses are obtained with each trigger operation of the welding unit 40. A recycling relay 68 is shown connected in parallel with the single shot relay 66 and is used for automatic operation where a continuous sequence of welding pulses is obtained with a single triggering operation of the unit 40. A switch 70 is provided to selectively connect across the input leads either the single shot relay 66 or the recycling relay 68 to provide either a single firing output or recycling output of weld time duration. The switch 70 includes positions for selection of either manual and automatic modes of operation. In the "MAN" position the relay 66 is connected to the leads and in the "AUTO" position the relay 68 is energized.

A welding initiate switch, shown diagrammatically at 72, is provided in the welding head 40 and is actuated by trigger 74. Upon actuation of the switch 72, both the weld time relay 66 and the recycle relay 68 are energized. Depending upon the position of switch 70 the relay is initiated for either single weld or multiple weld pulses. In "MAN," each time the initiate switch 74 is operated, the switch 54 is closed, while in "AUTO" the initiate switch 74 may be held closed and the relay 68 recycles relay 66 in a preselected timed sequence each as shown by the pulse diagram at 100 in FIG. 5. The rectangular pulses indicate the duration when the relay is "ON," i.e., the contacts 54 are closed.

The single shot time delay relay 66 may be of any suitable type wherein closure of the contact 72 will immediately be transferred to energize and close contacts 54, which will remain closed for a predetermined time depending upon the position to which the wiper arm of the potentiometer 80 is adjusted. After the predetermined time delay expires the contacts will automatically open. Thus, relay 66 provides a single "ON" pulse. Suitable time delay relays which may be used in carrying out this invention are solid state relays marketed under the designations "SDR" and "FDS" by Omnetics, Inc. of Syracuse, New York.

The recycling relay 68 interconnected with relay 66 as shown at 69 is also operated by actuating weld initiate switch 72 with trigger 74 being held in the "ON" position. Contacts in relay 68 then open and close on a predetermined sequence of pulses. These repeating pulses are connected to activate relay 66. As a result, contacts 54 in timer relay 66 close for the selected "weld pulse time," initiating passage of current pulses from unit 58 to SCR 44. Potentiometer means, as shown at 82, is adjustable to establish any desired "ON-OFF" sequence as shown at 100 in FIG. 5 which will continue to recycle as long as switch 72 is held closed.

When contacts 54 are closed by relay 66, the pulses induced in the secondary of transformer 56 are coupled to the gate 52 of the SCR 44 so that the SCR will conduct through the primary of transformer 42, generating current pulses for electrode 86 or 86' of the spot welder 40. One end of the secondary is connected to the welding head 40 and the other to the support structure, such as the end rings or truss rods, representing electrical ground.

As shown, electrode 86' is of circular configuration and is preferable for use in "AUTO" mode of operation when series of pulses are continuously generated. In this way the electrode may be simply rolled along any given line and periodic impulses will be generated to spot weld at a series of spaced locations. The amount of time during which the switch 54 is closed, determines the number of current pulses through the anode-cathode junction of the SCR 44 and consequently the number of current pulses through the primary winding of transformer 42. The time of closure of the switch 54 is determined by adjustment of the potentiometer 80 in manual operation of the unit and the potentiometers 82 and 84 in automatic operation of the unit.

Figure 4:
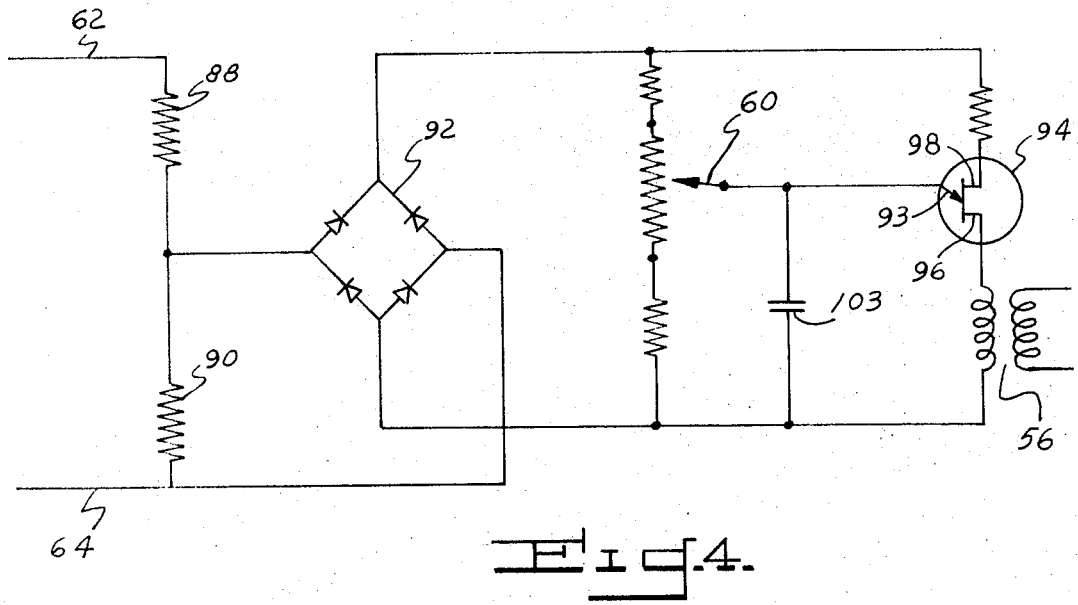
FIG. 4 is a schematic circuit diagram illustrating one type of control unit for use in the FIG. 3 circuit.

In general, the adjustment of the potentiometer 60 (FIGS. 3 and 4) adjusts the time constant of the control unit 58, an illustrative circuit diagram of which is shown in FIG. 4. This circuit provides the time in each positive pulse cycle when the SCR 44 will conduct. The control unit includes a voltage divider network composed of resistors 88 and 90 and a full wave rectifier 92 which provides a series of positive line pulses 102 (FIG. 5) across voltage divider network provided by adjustable potentiometer 60.

The wiper arm of the potentiometer 60 is connected to the emitter electrode 93 of a unijunction transistor 94 (UJT) which also includes two bases, base one — 96 and base two — 98. In its "ON" condition, the resistance between the emitter and base one of the UJT is very low and the emitter current will be limited primarily by the series resistance of the emitter to the base one external circuit. A capacitor 103 is connected across the circuit from the emitter through the primary of transformer 56 to the base one electrode. The capacitor 103 and the resistance in series therewith, determined by the setting on potentiometer 60, provides the time constant which establishes the period or oscillation of the UJT circuit.

In effect, the circuit shown in FIG. 4 is a relaxation oscillator and the capacitor 103 is charged through the resistance of potentiometer 60 in series therewith. The voltage stored by capacitor 103 is determined by positioning of the wiper arm of the potentiometer 60 and continues to increase until the breakdown point of the UJT. At its breakdown point UJT 94 turns "ON" and the capacitor 103 discharges through the emitter and base one junction of the UJT, through the primary coil of transformer 56 providing a current pulse to the gate circuit of the SCR 44. When the voltage applied to the emitter 93 reduces to a predetermined value, the UJT turns "OFF" and the cycle is repeated. The period of oscillation is directly proportional to the product of the resistance set on potentiometer 60 and the capacitance of capacitor 103. The UJT can be triggered at any intermediate part of the cycle of pulses 102 by reducing either the interbase voltage alone or the supply voltage. This results in an equivalent decrease in peak point voltage and causes the UJT to trrigger if the peak point voltage drops below the voltage on capacitor 103 applied across the emitter and base one. The main supply voltage can thus be used to synchronize the base trigger circuit.

Figure 5:
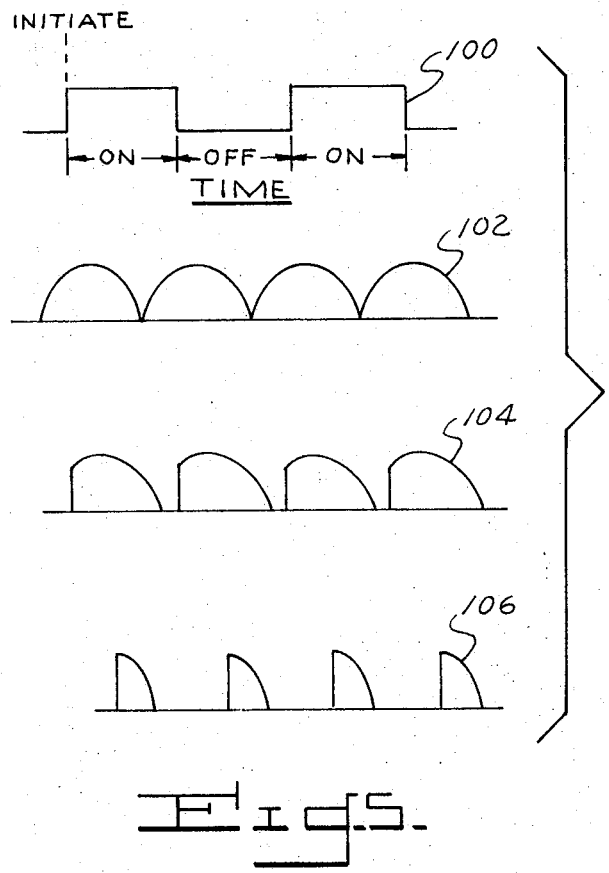
FIG. 5 is a diagram illustrative of various electrical pulses developed in portions of the circuits shown in FIGS. 3 and 4.

The series of positive pulses, as shown at 102 in FIG. 5, are supplied to the base two of the UJT. At the end of each half cycle of these pulses, the voltage at the base two will drop to zero, causing the UJT to trigger. The capacitor 103 is thereby discharged at the beginning of each half cycle through the emitter base one of the UJT and the trigger circuit is thus synchronized with the line voltage. The pulses across transformer 56 can be produced early or late in each half cycle as illlustrated at 104 or 106, respectively, in FIG. 5. The pulse initiation point may be at any time throughout the half cycle of the pulse depending upon the time constant of the trigger circuit which is a function of the resistance set on the potentiometer 60 and the capacitance of the capacitor 103. These pulses are transformer coupled to the control grid 52 of the SCR 44, FIG. 3, so long as the switch 54 remains closed. Thus, the longer the switch 54 is closed, the greater will be the number of current pulses applied to cause the SCR to conduct and the greater will be the duration of the welding current. By this arrangement a dual control is provided, both as to the number and shape of the SCR trigger pulses which in essence make up the welding pulse.

For fine wire welding, it has been found that fewer, small duration pulses will produce good welding results without distortion of the fine wire. When wire of a somewhat coarser character is to be spot welded, it is preferable to increase the number of pulses by adjustment of the time delay relay 66. Adjustment of this relay, as has heretofore been explained, will maintain the relay 54 on "ON" for a longer duration of time whereby a longer train of pulses will be coupled to the control grid and the longer will be the output of the SCR. For much coarser wire it may be desirable not only to increase the number of pulses, but also to increase the size or time duration of each pulse, such as for example changing from pulses 106 to pulses 104 in FIG. 5. This would be accomplished by adjustment of potentiometer 60 of the trigger control unit.

Having thus disclosed this invention, what is claimed is:

1. Method of welding metallic wire screen to a supporting cylindrical structure for use in papermaking, comprising the steps of enveloping the circumference of said structure from end-to-end with said screen and tensioning the screen with its ends in abutting end-to-end relationship, welding said screen to said structure at a plurality of sites along the abutting edges of the screen and adjacent thereto with electrical impulses composed of a plurality of pulses and controlling the number and size of said pulses depending upon the gauge of the wire forming said screen.

2. Method of claim 1 in which an underlayment of relatively coarse wire mesh is applied to the cylindrical structure before said screen is wrapped therearound, affixing the underlayment to the structure and then spot welding the screen to said underlayment.

3. Method of claim 1 wherein the underlayment comprises a strip of relatively coarse metallic wire mesh disposed axially along the cylindrical support from end-to-end, the abutting edges of said screen being abutted generally along the central portion of the strip.

4. Method of claim 1 wherein controlling of said pulses is achieved by using a silicon controlled rectifier having an anode-cathode junction in series with the primary winding of a transformer, the secondary of said transformer being electrically connected to a welding electrode, and said rectifier including a control gate in circuit with an electronic trigger control unit.

5. Method of claim 4 wherein said trigger control unit includes a unijunction transistor.

* * * * *